(12) United States Patent
Ohmori et al.

(10) Patent No.: US 7,027,497 B2
(45) Date of Patent: Apr. 11, 2006

(54) ADAPTIVE EQUALIZATION METHOD AND ADAPTIVE EQUALIZER

(75) Inventors: Hiroo Ohmori, Yokohama (JP); Takahiro Asai, Yokosuka (JP); Tadashi Matsumoto, Ebina (JP)

(73) Assignee: NTT DoCoMo, Inc., Tokyo (JP)

( * ) Notice: Subject to any disclaimer, the term of this patent is extended or adjusted under 35 U.S.C. 154(b) by 775 days.

(21) Appl. No.: 10/017,591

(22) Filed: Dec. 18, 2001

(65) Prior Publication Data

US 2002/0110188 A1  Aug. 15, 2002

(30) Foreign Application Priority Data

Dec. 19, 2000  (JP)  ............................. 2000-385699

(51) Int. Cl.
| H03H 7/30 | (2006.01) |
| H04L 27/06 | (2006.01) |
| H04L 27/14 | (2006.01) |
| H04L 27/22 | (2006.01) |

(52) U.S. Cl. ...................... 375/229; 375/232; 375/233; 375/234; 375/316; 375/341

(58) Field of Classification Search ................ 375/232, 375/233, 234, 316, 341, 229
See application file for complete search history.

(56) References Cited

U.S. PATENT DOCUMENTS

| 5,673,294 A * | 9/1997 | Namekata .................... 375/341 |
| 5,920,599 A * | 7/1999 | Igarashi ....................... 375/341 |
| 6,269,124 B1 * | 7/2001 | Nagayasu et al. .......... 375/262 |
| 6,570,918 B1 * | 5/2003 | Rademacher ............... 375/232 |

OTHER PUBLICATIONS

N. Nefedov, et al., 2nd International Symposium on Turbo Codes and Related Topics, X-0009025553, pp. 423-426, "Turbo Equalization and Iterative (TURBO) Estimation Techniques for Packet Data Transmission", Sep. 4-7, 2000.
X. Wang, et al., IEEE Transactions on Communications, vol. 47, No. 7, XP-000849079, pp. 1046-1061, "Iterative (TURBO) Soft Interference Cancellation and Decoding for Coded CDMA", Jul. 1999.

(Continued)

*Primary Examiner*—Mohammed Ghayour
*Assistant Examiner*—Freshteh Aghdam
(74) *Attorney, Agent, or Firm*—Oblon, Spivak, McClelland, Maier & Neustadt, P.C.

(57) ABSTRACT

During reception of a training signal in a received signal R(n) an estimated impulse response value $H_m(n)$ of an M-channel, and a tap coefficient G(n) of a linear filter 111 is calculated by an adaptive algorithm through the use of the received signal R(n) and the training signal b(n). For an information symbol of the received signal R(n), the received signal R(n) is subjected to linear filtering with the most recently calculated tap coefficient G(n), and the linear filtering output Z(n) and the most recently estimated impulse response value $H_m(n)$ are used to calculate a soft decision value $\lambda_1$. In the second and subsequent rounds of equalization, the likelihood b'(n) of a soft decision value $\lambda_2[b(n)]$ from a decoder is calculated, and a replica is generated by linear-filtering the likelihood b'(n) with an estimated impulse response value vector $H_L(n)$ obtained by approximating intersymbol interference with the current code b(n) to zero. A difference signal $R_c(n)$ between the replica and the received signal is calculated, and the estimated impulse response value vector $H_L(n)$ is used to update the tap coefficient G(n). Then the signal Z(n) is obtained by linear-filtering the difference signal $R_c(n)$ with the updated tap coefficient G(n), and the signal Z(n) and the estimated impulse response value vector $H_L(n)$ are used to calculate the soft decision value $\lambda_1$.

10 Claims, 9 Drawing Sheets

OTHER PUBLICATIONS

D. Reynolds, et al., Signal Processing, vol. 81, No. 5, XP-004239259, pp. 989-995, "Low-Complexity Turbo-Equalization for Diversity Channels", May 2001.

M. Sellathurai, et al., Proceedings of IEEE Conference on Wireless Communications and Networking, vol. 1, XP-010532516, pp. 315-320, "Trubo-Blast for High-Speed Wireless Communications", Sep. 23, 2000.

* cited by examiner

ADAPTIVE EQUALIZATION METHOD AND ADAPTIVE EQUALIZER

BACKGROUND OF THE INVENTION

The present invention relates to an adaptive equalization method and an adaptive equalizer for use, for example, in mobile communications to reduce the influence of fading.

In a mobile communications environment signals transmitted from mobile stations arrive at a base station from various directions under the influence of surrounding buildings, trees and so forth. The influence of intersymbol interference, which results from the arrival of paths of large delay time differences in such a multipath channel, poses a serious problem for mobile communications. A known technique for lessening the influence of a signal waveform distortion by the intersymbol interference is an equalization technique that estimates the characteristic of the channel and performs equalization of delayed paths based on the estimated characteristic. One of equalization algorithms used in the equalization technique is a turbo-coding-technique-applied iterative equalization algorithm that achieves a very excellent error rate characteristic in low SNR. The turbo coding method implements, with practical coding-decoding complexity, an error rate characteristic that is almost a ceiling value obtainable with a channel coding method; only the presence of such an error rate is merely suggested in information theory. With the turbo coding method, the transmitting side transmits coded information sequence and its rearranged or interleaved version, and the receiving side repeatedly decodes them alternately with each other. Since the process of generating a coded sequence of convolution codes in the turbo coding is equivalent to the process of generation of the intersymbol interference in multipath channel, the decoding process of the turbo coding technique can be applied to the equalization of delayed paths.

FIG. 1 illustrates in block form an example of a transmitter-receiver for the iterative equalization disclosed in Daryl Reynolds and Xiaodong Wang, "Low Complexity Turbo-Equalization for Diversity Channels," http://ee.tam-u.edu/reynolds/. A transmitter 10 encodes an information bit sequence d(i) by an encoder 11, then rearranges the coded output sequence by an interleaver 12, and modulates the carrier by a modulator 13, thereafter transmitting the modulated output bit sequence b(i) over a channel 14. In a receiver 20 delayed paths are equalized by a SISO (Soft-Input Soft-Output) equalizer 21 for the received signal r(t), and the log-likelihood ratio (LLR) $\Lambda_1$ between +1 and −1 for each code bit b(i) of the received signal r(t) is derived by the following equation (1).

$$\Lambda_1[b(i)] = \log \frac{Pr[b(i) = +1|r(t)]}{Pr[b(i) = -1|r(t)]} \quad (1)$$
$$= \log p \frac{[r(t)|b(i) = +1]}{p[r(t)|b(i) = -1]} + \log \frac{Pr[b(i) = +1]}{Pr[b(i) = -1]}$$
$$= \lambda_1[b(i)] + \lambda_2[b(i)]$$

In Eq. (1) the first term, $\lambda_1[b(i)]$, is extrinsic or external information derived by subtracting a priori information $\lambda_2[b(i)]$, by a subtractor 26, from the log-likelihood ratio $\Lambda_1[b(i)]$ provided from the SISO equalizer 21. The second term, $\lambda_2[b(i)]$, is the a priori information that is a rearranged or interleaved version, by an interleaver 25, of $\lambda_2[b(n)]$ obtained by subtracting $\lambda_1[b(n)]$, by a subtractor 24, from a log-likelihood ratio $\Lambda_2[b(n)]$ provided from a SISO decoder 23 in the previous iteration. The initial value of $\lambda_2[b(n)]$ is zero. The a priori information $\lambda_2[b(i)]$ is used as an a priori LLR value of a coded bit string $\{b(i)\}$. The extrinsic information is restored by a de-interleaver 22 to $\lambda_1[b(i)]$, which is input as a posteriori information to the SISO decoder 23. The SISO decoder 23 uses the a posteriori information to derive a posteriori LLR value $\Lambda_2$ of the coded bit string $\{b(i)\}$ by the following equation (2).

$$\Lambda_2[b(n)] = \lambda_2[b(n)] + \lambda_1[b(n)] \quad (2)$$

In the second and subsequent iterations, $\lambda_1[b(n)]$ is subtracted by the subtractor 24 from the a posteriori LLR value $\Lambda_2$ derived by the SISO decoder 23 to obtain extrinsic information $\lambda_2[b(n)]$, which is provided as a priori information $\lambda_2[b(i)]$ via an interleaver 25 to the SISO equalizer 21. Such iterations of equalization and decoding update the LLR value, providing a more probable LLR value. That is, the first log-likelihood ratio $\Lambda_1$ is calculated by the first adaptive equalization of the received digital signal, and the first log-likelihood ratio $\Lambda_1$ is decoded to obtain the second log-likelihood ratio $\Lambda_2$, which is used to perform the second adaptive equalization of the received digital signal to obtain the first log-likelihood ratio $\Lambda_1$, which is then decoded, and the decoded value is output.

In the iterative equalization the SISO equalizer and the SISO decoder use a MAP (Maximum A-posteriori Probability) algorithm, Log-MAP algorithm based on the MAP algorithm, or Max-Log-MAP algorithm that has reduced the computational complexity of equalization and decoding through use of approximate calculation. Still another algorithm is SOVA (Soft-Output Viterbi Algorithm) that provides bit reliability information while performing optimum decoding on a sequence-wise basis. In the case of using any of these algorithms for equalization by the equalizer, however, the complexity of the algorithm exponentially increases with respect to the maximum number of delayed symbols to be considered in the equalizer, resulting in very high computational complexity. For example, when BPSK is used as the modulation system, assuming that the storage capacity of one receiving channel is 10 symbols (the maximum number of delayed symbols to be considered in the equalizer being 10 symbols), the number of states becomes as large as $2^{10}=1024$, exceeding practical computational complexity. The computational complexity could be reduced by using a linear equalizer for the iterative equalization.

FIG. 2 illustrates a typical example of the linear equalizer. In the illustrated equalizer sampled received signals are applied to a cascade-connection of delay elements (of τ-sec delay) 31 to obtain signals delayed by τ-sec intervals in a sequential order, which are weighted by a variable weighting circuit 32 having set therein a coefficient by a coefficient adaptation circuit 34 and combined by an adder 33 to implement equalization. As the delay time τ, the sampling period T or T/2 is usually chosen. Considering the equalizer as one filter, the linear equalizer achieves equalization by implementing a filter characteristic convenient for identifying the received signal. This filter basically implements an inverse characteristic of a channel distortion.

When such a linear equalizer is used for the above-described iterative equalization, it is necessary to derive a soft decision value as the equalizer output. In the aforementioned literature by Daryl Reynolds and Xiaodong Wang, there is set forth a scheme in which, by deriving the soft decision value through the use of the linear equalizer, the iterative equalization can be achieved with less computational complexity than in the case of using the conventional algorithm such as MAP, SOVA or the like. In the literature a description is given of the application of the linear equalizer assuming the following discrete-time model as a channel model. A received signal sample r(n) is expressed as follows:

$$r(n) = \sum_{j=0}^{J-1} b(n-j)h(n;j) + \sigma v(n), n = 0, 1, \ldots, N-1 \quad (3)$$

$$v(n) = [v_0(n) v_1(n) \ldots v_{M-1}(n)]^T \quad (4)$$

$$h(n;j) = [H_0(n;j) h_1(n;j) \ldots h_{M-1}(n;j)]^T \quad (5)$$

In the above, M is the number of channel outputs and $r(n) = [r_0(n) r_1(n) \ldots r_{M-1}(n)]^T$ is a vector representing a received sample value in each channel at time n, where $T$ indicates a transposed matrix. For example, in the case of using a plurality of antennas, M corresponds to the number of antennas. B(n) represents a coded bit, and v(n) in Eq. (4) is a complex vector of an average 0, representing noise. In Eq. (5), h(n;j) is a vector representing the tap weighting coefficient of the channel, and J is the channel ISI length. Now, a received signal vector R(n), a noise vector V(n), a coded bit vector B(n) and a channel matrix $H_m(n)$ are defined as follows:

$$R(n) = \begin{bmatrix} r(n+J-1) \\ \vdots \\ r(n) \end{bmatrix}_{MJ \times 1} \quad (6)$$

$$V(n) = \begin{bmatrix} v(n+J-1) \\ \vdots \\ v(n) \end{bmatrix}_{MJ \times 1} \quad (7)$$

$$B(n) = ([b(n+(J-1))b(n+(J-2)) \ldots b(n+1)b(n)b(n-1) \ldots b(n-(J-1))])^T \quad (8)$$

$$H(n) = [h(n;0) \ldots h(n;J-1)] \quad (9)$$

$$H_m(n) = \begin{bmatrix} H(n) & 0 & \cdots & 0 \\ 0 & H(n) & & \vdots \\ \vdots & & \ddots & 0 \\ 0 & \cdots & 0 & H(n) \end{bmatrix}_{MJ \times (2J-1)}$$

$$= \begin{bmatrix} h(n;0) & h(n;1) & \cdots & h(n;J-1) & 0 & \cdots & 0 \\ 0 & h(n;0) & h(n;1) & \cdots & h(n;J-1) & 0 & 0 \\ \vdots & & \ddots & & & & \vdots \\ 0 & 0 & h(n;0) & h(n;1) & \cdots & h(n;J-1) & 0 \\ 0 & \cdots & 0 & h(n;0) & h(n;1) & \cdots & h(n;J-1) \end{bmatrix}_{MJ \times (2J-1)} \quad (10)$$

The vectors R(n) and V(n) given by Eqs. (6) and (7) are column vectors of a matrix with MJ rows and one column, that is, MJ-dimensional column vectors. B(n) is a (2J−1)-dimensional column vector, H(n) is a matrix with M rows and J columns, and $H_m(n)$ is a matrix with MJ rows and (2J−1) columns. From the above, Eq. (3) becomes as follows:

$$R(n) = H_m(n)B(n) + \sigma V(n) \quad (11)$$

Next, the likelihood of the code bit string is defined by the following equation using the a priori LLR value $\lambda_2[b(k)]$ of the code bit string b(i).

$$b'(k) = \tanh[\lambda_2[b(k)]/2], \; n-(J-1) \leq k \leq n+(J-1) \quad (12)$$

Eq. (12) has the property that it rapidly approaches 1 or −1 upon deviation of a variable x of a hyperbolic function tanhx from 0, and the likelihood b'(k) represents an estimated value of b(k). Further, that estimated value vector of the code bit in the received signal vector R(n) which affects, as intersymbol interference, code bit b(n) at time n is given by the following equation.

$$B'(n) = [b'(n+(J-1))b'(n+(J-2)) \ldots b'(n+1)0b'(n-1) \ldots b'(n-(J-1))]^T \quad (13)$$

In Eq. (13), since B'(n) is an estimated value vector that is used to subtract from the received signal vector R(n) the intersymbol interference component for the code bit b(n) at time n, the element corresponding to b(n) of the vector B'(n) is set to zero. A difference vector $R_c(n)$ by subtracting an intersymbol interference component replica from the received signal vector R(n) is defined by the following equation using the estimated intersymbol interference code vector B'(n).

$$R_c(n) = R(n) - H_m(n)B'(n) = H_m(n)[B(n) - B'(n)] + \sigma v(n) \quad (14)$$

The difference vector $R_c(n)$ is subjected to filtering expressed by the following equation through the use of a linear filter of tap coefficient G(n).

$$Z(n) = G(n)^H R_c(n) \quad (15)$$

where $^H$ is a conjugate transposed matrix. The tap coefficient G(n) is so chosen as to minimize the mean square error between the code bit B(n) and the filter output Z(n) as expressed by the following equation.

$$G(n) = \arg\min E\{\|b(n) - G(n)^H R_c(n)\|^2\} = \arg\min G(n)$$
$$^H E\{R_c(n)R_c(n)^H\}G(n) - 2 \; G(n)^H E\{b(n)R_c(n)\} \quad (16)$$

where arg min E { } represents that one of all J-dimensional vectors G whose content of { } is minimum.

Expansion of first and second terms in Eq. (16) gives $$E\{R_c(n)R_c(n)^H\} = H_n(n)\Lambda(n)H_m(n)^H + \sigma^2 I \quad (17)$$

$$E\{b(n)R_c(n)\} = H_m(n)e_j \quad (18)$$

where I is a unit matrix and $$\Lambda(n) = Cov\{B(n) - B'(n)\}$$
$$= diag[1 - b'^2(n+(J-1)), \ldots, 1 - b'^2(n+1), 1, 1 - b'^2(n-1),$$
$$\ldots, 1 - b'^2(n-(J-1))] \quad (19)$$

In the above, Cov represents a covariance matrix and diag represents a diagonal matrix. $e_j$ is a vector of a length 2J−1, a J-th element being 1 and other elements being 0s. By solving the normal equation with the gradient vector on the right-hand side of Eq. (16) to 0 and substituting Eqs. (17) and (18), the optimum tap coefficient G(n) is given as follows:

$$G(n) = [H_m(n)\Lambda(n)H_m(n)^H + \sigma^2 I]^{-1} H_m(n)e_j \quad (20)$$

Substitution of the thus derived tap coefficient G(n) into Eq. (15) gives $$Z(n) = e_J^T H_m(n)^H [H_m(n)\Lambda(n)H_m(n)^H + \sigma^2 I]^{-1} [R(n) - H_m(n)B(n)] \quad (21)$$

In this case, since it is necessary that $H_m(n)$ be a full column rank, the antenna number M needs to be at least 2 or more.

Assuming that the filter output can be approximated by a Gaussian distribution, Z(n) by Eq. (21) can be described as follows (see V. Poor and S. Verdu, "Probability of Error in MMSE Multiuser Detection," IEEE Trans. Information Theory., vol. IT-43, No. 3, pp. 858–871, May 1997).

$$Z(n) = \mu(n)b(n) + \eta(n) \quad (22)$$

where μ(n) is an equivalent amplitude of the output signal and η(n) represents a Gaussian distribution of an average 0 and the variance $v^2(n)$. Therefore, μ(n) and v(n) can be expressed as follows:

$$\mu(n) = E\{Z(n)b(n)\}$$
$$= \left[H_m(n)^H [H_m(n)\Lambda(n)H_m(n)^H + \sigma^2 I]^{-1} H_m(n)\right]_{J,J} \quad (23)$$

where $[\ ]_{J,J}$ indicates the element at the intersection of the J-th row and the J-th column of the matrix.

$$V^2 = var\{Z(n)\} = \mu(n) - \mu^2(n) \quad (24)$$

From the above, the extrinsic information derived by the linear equalizer can be deduced from the following equation.

$$\lambda_1[b(n)] = \log p \frac{(Z(n)|b(n) = +1)}{p(Z(n)|b(n) = -1)} = \frac{4 Real\{Z(n)\}}{1 - \mu(n)} \quad (25)$$

To obtain the optimum tap coefficient G(n) with the above-described method, however, it is necessary that the inverse matrix calculation expressed by the following equation be conducted in Eq. (20) for each point in time; hence, much time is required for calculation.

$$\Phi(n) = [H_m(n)\Lambda(n)H_m(n)^H + \sigma^2 I]^{-1} \quad (26)$$

With the conventional method for iterative equalization by the linear equalizer, the inverse matrix calculation needs to be conducted for each point in time to update the tap coefficient—this gives rise to the problem of high computational complexity.

SUMMARY OF THE INVENTION

It is therefore an object of the present invention to provide an adaptive equalization method and apparatus that permit reduction of the computational complexity for deriving the tap coefficient of the linear equalizer for iterative equalization and hence allow shortening the time for computation.

According to a first aspect of the present invention, a received signal sample value and a known signal are used to estimate the impulse response of the channel, and a received signal sample value sequence is used to adaptively calculate the tap coefficient of a linear filter. The tap coefficient is used to perform linear filtering of the received signal sample value sequence, and the result of linear filtering and the estimated value of the impulse response are used to derive a soft decision value.

With this construction, in the case of using the linear equalizer for iterative equalization, the received signal sample value sequence is input thereto to adaptively derive the tap coefficient of the linear filter—this permits reduction of computational complexity as compared with the prior art method involving the inverse matrix calculation.

According to a second aspect of the present invention, in second and subsequent processing by an adaptive iterative equalizer for the iteration of equalization and decoding, an estimated value vector of the code bit based on the likelihood of a soft decision value from a decoder is subjected to linear filtering with an estimated impulse response value $H_m(n)$ to generate a replica of the received signal. The replica is subtracted from the received signal to create a difference signal $R_c(n)$ having removed therefrom the intersymbol interference component, then the tap coefficient of the linear filter is calculated, for example, using the Matrix Inversion Lemma, from the estimated impulse response value vector $H_L(n)$ approximated with the intersymbol interference component regarded as zero, then the difference, then the difference signal $R_c(n)$ is subjected to linear filtering using the tap coefficient, and the result of linear filtering and the estimated impulse response value vector are used to derive the soft decision value.

With this construction, the tap coefficient of the linear filter in second and subsequent iterative equalization by the linear equalizer can be calculated, for example, using the Matrix Inversion Lemma, by which it is possible to achieve adaptive equalization with less computational complexity than in the case of the conventional that involves the inverse matrix calculation of Eq. (20).

According to a third aspect of the present invention, a received signal sample value sequence and a known signal are used to estimate the impulse response of the channel, then a threshold value is set accordingly, and components of values smaller than the threshold value are removed from the estimated impulse response value vector, that is, the dimension of the estimated impulse response value vector is reduced. Further, components corresponding to those of the values smaller than the threshold value and hence removed from the estimated impulse response value vector are removed from the tap coefficient of a linear filter calculated from the received signal sample value sequence and the received signal vector to thereby reduce their dimension as well. The soft decision value is derived using the estimated impulse response value vector, the tap coefficient of the linear filter and the received signal vector of the thus reduced dimensions.

The above scheme permits reduction of the computational complexity for deriving the soft decision value when the linear equalizer is used for iterative equalization.

According to a fourth aspect of the present invention, the likelihood of the soft decision value from a decoder is calculated in second and subsequent processing by an adaptive equalizer for iteration of equalization and decoding, then the tap coefficient of the linear filter is calculated, for instance, using the Matrix Inversion Lemma from the estimated impulse response value vector reduced in dimension in the first round of iteration and stored in a memory, then the tap coefficient is used to perform linear filtering of a difference signal having subtracted therefrom an intersymbol interference component, and the result of linear filtering and the estimated impulse response value vector are used to derive the soft decision value.

This scheme allows reduction of the computational complexity for deriving the soft decision value in the second and subsequent iterative equalization by the linear equalizer as well.

DETAILED DESCRIPTION OF THE PREFERRED EMBODIMENT

Embodiment 1

In the method set forth in the afore-mentioned literature that employs a linear equalizer for iterative equalization, the likelihood b'(k) of the code bit is calculated by Eq. (12) using the a priori LLR value $\lambda_2[b(k)]$ of the code bit string.

In the first equalization processing, since the a priori LLR value $\lambda_2[b(k)]$ in Eq. (12) is zero in the absence of the a priori information, the likelihood b'(k) is all zeros as shown below.

$$b'(k)=[0\,0\,\ldots\,0\,\ldots\,]^T$$

Therefore, the difference vector $R_c(n)$ by Eq. (12) becomes as follows:

$$R_c(n)=R(n)-H_m(n)B'(n)=R(n) \quad (27)$$

and $\Lambda(n)$ becomes a $(2J-1)\times(2J-1)$ whose diagonal components are all ones as shown below.

$$\Lambda(n)=\text{Cov}\{B(n)-B'(n)\}=\text{diag}\{1,1,\ldots,1,1\} \quad (28)$$

Accordingly, the optimum tap coefficient $G(n)$ of the linear filter by Eq. (20) can be derived by the following calculation.

$$G(n)=[H_m(n)H_m(n)^H+\sigma^2 I]^{-1}H_m(n)e_j \quad (29)$$

From Eq. (29) the tap coefficient $G(n)$ is dependent on the value $H_m(n)$ corresponding to the impulse response of the channel. In the case where temporal variations of the channel due to high transmission rate or the like, that is, where the duration of a received burst path is so short that the channel characteristic of the received signal does not change in that time interval, the tap coefficient $G(n)$ is substantially constant. Accordingly, by precalculating the tap coefficient $G(n)$ prior to the processing of the information symbol period and using the precalculated value for processing of each information symbol, the computational complexity can be reduced as compared with that in the conventional system that derives the tap coefficient $G(n)$ for each information symbol. Moreover, since the above-mentioned temporal variations need not be taken into account as well in the calculation of the tap coefficient by Eq.(20), an adaptive algorithm can be used—this avoids the necessity for conducting the inverse matrix calculation to derive the tap coefficient $G(n)$, permitting reduction of computational complexity.

In view of the above, in the first embodiment of the present invention, the tap coefficient calculation is conducted by an adaptive algorithm to obtain $G(n)$ in a known signal period or training signal period prior to the processing of the information symbol period, and the value thus obtained is used to perform the processing in the information symbol period. This eliminates the needs for the inverse matrix calculation and the derivation of $G(n)$ at each point in time of the information symbol, enabling the computational complexity to be made lower than in the conventional scheme.

Figure 1:
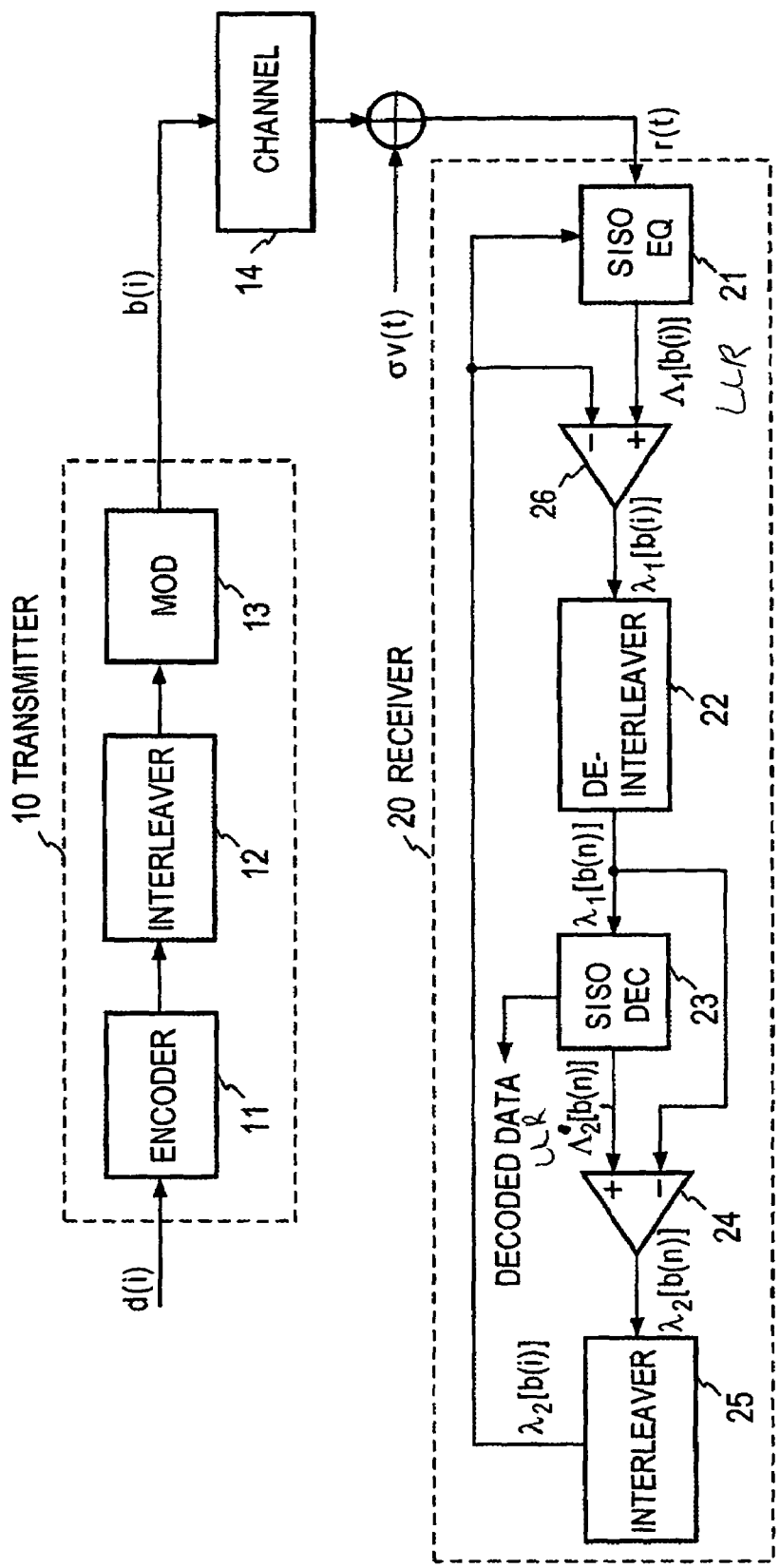
FIG. 1 is a block diagram of a transmitter-receiver of the iterative equalization scheme.
Figure 2:
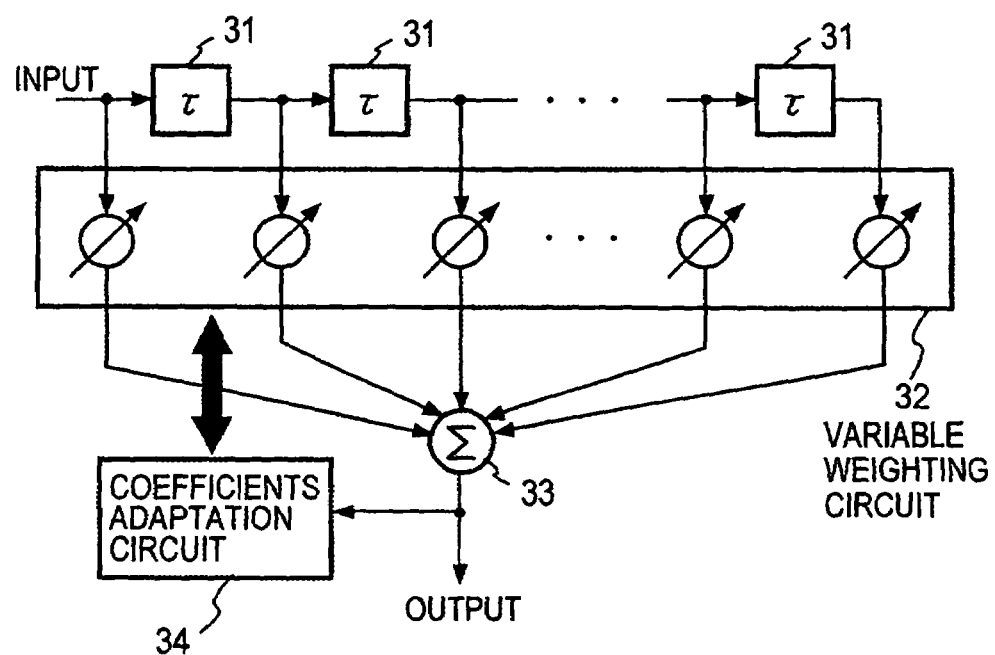
FIG. 2 is a block diagram of a linear adaptive equalizer.
Figure 3:
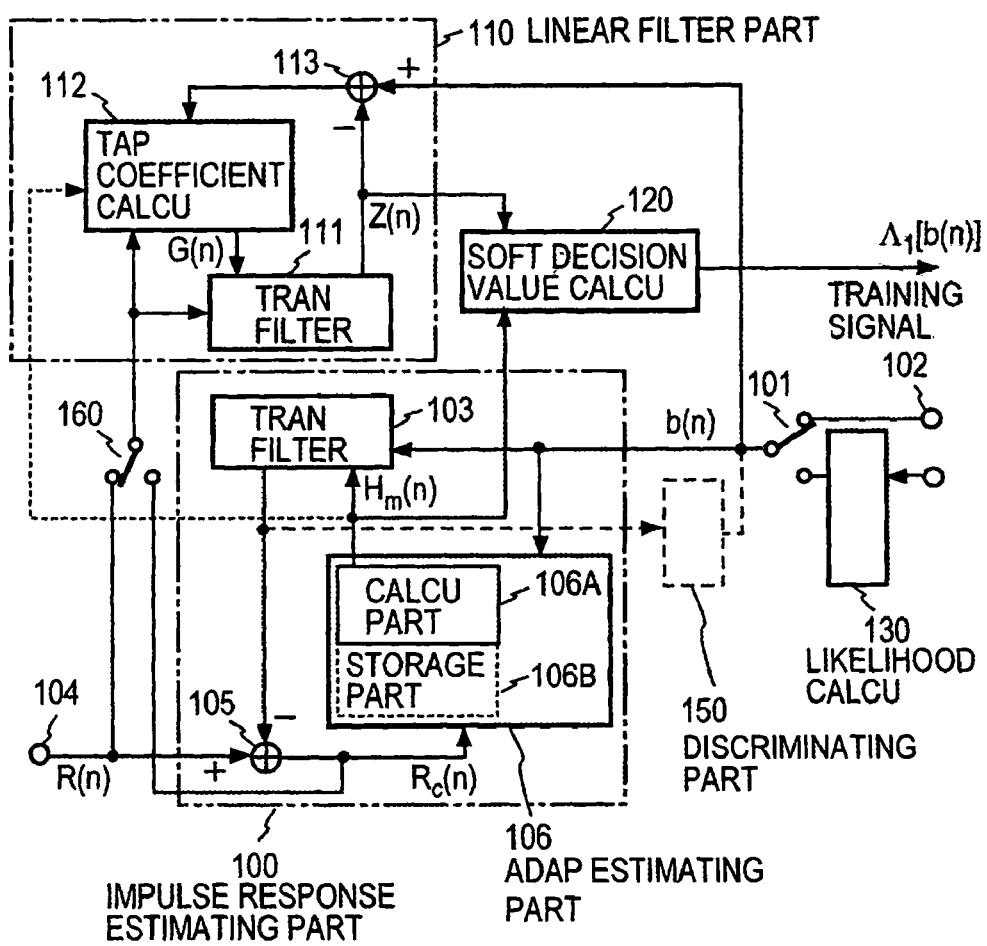
FIG. 3 is a block diagram illustrating the functional configuration for first equalization processing in a first embodiment of the adaptive equalizer according to the present invention.
Figure 4:
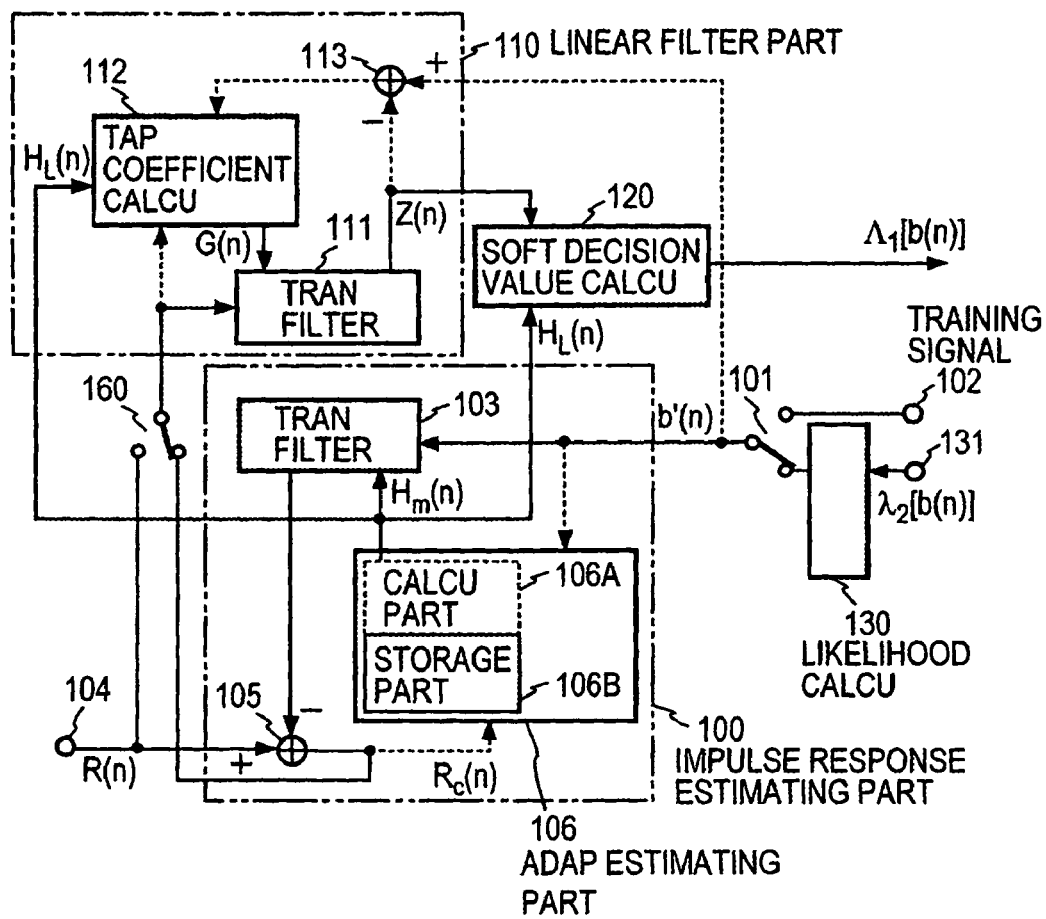
FIG. 4 is a block diagram of the functional configuration in second and subsequent rounds of equalization.

FIGS. 3 and 4 depict examples of functional configurations for first processing and the second and subsequent processing for equalization by the adaptive equalizer according to the first embodiment of the present invention. The illustrated adaptive equalizer corresponds to the equalizer 21 in FIG. 1. FIG. 3 shows the functional configuration for the first equalization processing, and FIG. 4 for the second and subsequent equalization processing. The broken line in FIG. 4 indicates the portion that is not used at the current point in time (in second and subsequent equalization processing) but used in the first equalization processing.

The adaptive equalizer of the first embodiment comprises an impulse response estimating part 100, a linear filter part 110, a soft decision value calculating part 120, a switch 101, a likelihood calculating part 130, and a switch 160. The impulse response estimating part 100 is made up of a transversal filter 103, a subtractor 105, and an adaptive estimating part 106. The linear filter part 110 is composed of a transversal filter 111, a tap coefficient calculating part 112, and a subtractor 113.

A description will be given, with reference FIG. 3, of the first equalization processing in the iterative equalization. In this instance, the switch 101 is connected to a known signal, for example, training signal input terminal 102, and the switch 160 is connected to an input terminal 104. In the impulse response estimating part 100, a training signal sequence b(n), provided as a known pattern from the training signal input terminal 102, and a difference value (vector) $R_c(n)$, obtained by subtracting an output replica $H_m(n)b(n)$ of the transversal filter 103 by the subtractor 105 from a received signal sample value sequence R(n) from the input terminal 104 are used to estimate the impulse response $H_m(n)$ of the channel in a calculating part 106A of the adaptive estimating part 106. This impulse response estimating calculation needs only to minimize the square of $R_c(n)$ through the use of an adaptive algorithm utilized in an ordinary adaptive equalizer. The estimated impulse response value $H_m(n)$ having converged at the point of termination of the training signal sequence b(n) is stored in a storage part 106B.

In the linear filter part 110, the received signal sample value sequence R(n) is input to the transversal filter 111 as a linear filter, by which it is subjected to linear filtering with the tap coefficient G(n) calculated in the tap coefficient calculating part 112, then the filtered output $Z(n)=G_H(n)^H R(n)$ is subtracted by the subtractor 113 from the training signal sequence b(n), and the difference is input to the tap coefficient calculating part 112 to update the tap coefficient G(n) of the linear filter. This updating calculation utilizes an adaptive algorithm. That is, in the first iteration of equalization, since R(n)=Rc(n) from Eq. (27), the tap coefficient G(n) is so determined by the adaptive algorithm as to minimize $\|b(n)-G(n)^H R(n)\|$ from Eq. 16. On this account, the tap coefficient G(n) can be calculated with less complexity than in the case of conducting the inverse matrix calculation by Eq. (20). The updating of the tap coefficient G(n) stops with the termination of the training signal sequence b(n), and the tap coefficient at this time is held unchanged.

The received signal after termination of the training signal sequence b(n), that is, the information-symbol received signal sample sequence R(n), is subjected to linear filtering by the transversal filter 111 with the most recently updated tap coefficient G(n). The filtering output Z(n) and the ultimately estimated channel impulse response value $H_m(n)$ are used to calculate, as the first equalization output, the soft decision value $\lambda_1[b(n)]$ in the soft decision value calculating part 120. In the first iteration of equalization, since the a priori information $\lambda_2[b(n)]=0$, $\Lambda_1=[b(n)]=\lambda_1[b(n)]$. The soft decision value $\lambda_1[b(n)]$ is fed to the de-interleaver 22 (see FIG. 1).

Next, a description will be given first of the principle of equalization in the second and subsequent rounds of iterative equalization and then of concrete equalization processing with reference to FIG. 4. In the second and subsequent rounds of equalization processing, the received signal R(n) used in the first iteration of processing is input again. On the other hand, when the likelihood b'(n) is calculated by Eq. (12) from the output of the decoder 23 (FIG. 1) produced for the result of the first iteration equalization, to be more precise, from the soft decision value $\lambda_2[b(n)]$ of the code bit fed from the interleaver 25, the likelihood b'(n) is approximately +1 or −1 if Eb/No (Bit energy-noise ratio) is high. In other words, the estimated intersymbol interference code vector of Eq. (13) can be approximated as expressed by the following equation.

$$B'(n) \approx [\pm 1, \pm 1, \ldots, \pm 1, 0, \pm 1, \ldots, \pm 1, \pm 1]^T \quad (30)$$

The use of thus approximated b'(n) permits approximation of Eq. (19) to the following equation.

$$\Lambda(n) = \text{Cov}\{B(n) - B'(n)\} = \text{diag}\{0,0, \ldots 0,1,0, \ldots, 0,0\} \quad (31)$$

Substituting Eq. (31) into Eq. (20), the tap coefficient G(n) of the linear filter can be obtained by conducting the following calculation.

$$G(n) = [H_L(n)H_L^H(n) + \sigma^2 I]^{-1} H_L \quad (32)$$

where $H_L(n)$ is the vector of one column of M by J rows expressed by $$H_L(n) = [h(n; J-1) \ldots h(n; 0)]^T = [h_0(n; J-1) \ldots h_{M-1}(n; J-1) \; h_0(n; J-2) \ldots h_{M-1}(n; J-2) \ldots h_0(n; 0) \ldots h_{M-1}(n; 0)]^T.$$

In this instance, the use of the Matrix Inversion Lemma in the calculation of the tap coefficient G(n) of the linear filter by Eq. (32) allows reduction of the computational complexity therefor. With such approximation of the estimated intersymbol interference code vector B(n) as expressed by Eq. (30), $H_L(n)$ becomes the vector of one column of M by J rows as mentioned above—this avoids the need for conducting the inverse matrix calculation, permitting substantial reduction of the computational complexity as compared with that needed by the conventional scheme. Thus, according to the present invention, in the second and subsequent rounds of iterative equalization the computational complexity in the tap coefficient calculating part for deriving the tap coefficient G(n) of the linear filter can be reduced through utilization of the approximation by Eq. (31) and the Matrix Inversion Lemma.

FIG. 4 illustrates in block form an example of the functional configuration in the second and subsequent rounds of equalization by the adaptive equalizer of the first embodiment. The change-over switch 101 is connected to the output of the likelihood calculating part 130, and the switch 160 is connected to the output of the subtractor 105. The soft decision value $\lambda_2[b(n)]$ of each bit of the code sequence, which is the output from the decoder 23 (the output from the interleaver 25) in the previous round of iterative equation, is input to the likelihood calculating part 130 from a terminal 130, which conducts the calculation of Eq. (12), outputting the likelihood b'(n). The likelihood b'(n) is filter-processed by the transversal filter 103 using the estimated channel impulse response value $H_m(n)$ stored in the storage part 106B, obtaining $H_m(n)B'(n)$ in Eq. (14) as a replica of the intersymbol interference in the received signal R(n). The output replica of the transversal filter 103 is subtracted by the subtractor 105 from the received signal value sequence R(n) to derive the difference value $R_c(n)$ of Eq. (14).

The tap coefficient G(n) of the linear filter is calculated by Eq. (32) using, as the input therefor, only the estimated channel impulse response value $H_L(n)$ stored in the storage part 106B unlike in the scheme for deriving the tap coefficient of the linear filter in the first iteration of iteration.

This calculation utilizes the afore-mentioned Matrix Inversion Lemma. That is, when this Lemma is expressed by $A=B^{-1}+CD^{-1}C^H$, where A and B represent (M by M) positive definite matrixes, C an (M by N) matrix, D an (N by N) positive definite matrix, an inverse matrix of A is given by $$A^{-1} = B - BC(D + C^H BBC)^{-1} C^H B \quad (33)$$

Applying this Lemma to the calculation of the inverse matrix in Eq. (32), $$H_L(n)H_L^H(n) + \sigma^2 I = B^{-1} + CD^{-1}C^H,$$

$$H_L(n)H_L^H(n) = CD^{-1}C^H,$$

$$\sigma^2 I = B^{-1},$$

$$h(n) = C,$$

$$D^{-1} = I,$$

$$H_L^H(n) = C^H$$

By using them to calculate Eq. (33), the inverse matrix calculation in Eq. (32) is solved. Incidentally, Eq. (33) also contains an inverse matrix calculation $(D+C^H BBC)^{-1}$, but this inverse matrix is also scalar, and hence it can similarly be calculated.

The thus calculated tap coefficient value G(n) is used to perform linear filtering of the difference value $R_c(n)$ by the transversal filter 111, and the filtering result Z(n) and the estimated channel impulse response value $H_L(n)$ stored in the storage part 106B are used to calculate Eq. (25) in the soft decision value calculating part 120 to derive the soft decision value $\Lambda_1[b(n)]$. The equivalent amplitude μ(n) in Eq. (25) is given by the following equation by substituting Eq. (31) for Λ(n) in Eq. (23).

$$\mu(n) = [H_L(n)^H [H_L(n)H_L(n)^H + \sigma^2 I]^{-1} H_L(n)] \quad (34)$$

$$= H_L(n)^H G(n)$$

Incidentally, in the first iteration of equalization the tap coefficient calculating part 112 of the linear filter part 110 may also use the Matrix Inversion Lemma to calculate the tap coefficient G(n).

Figure 5:
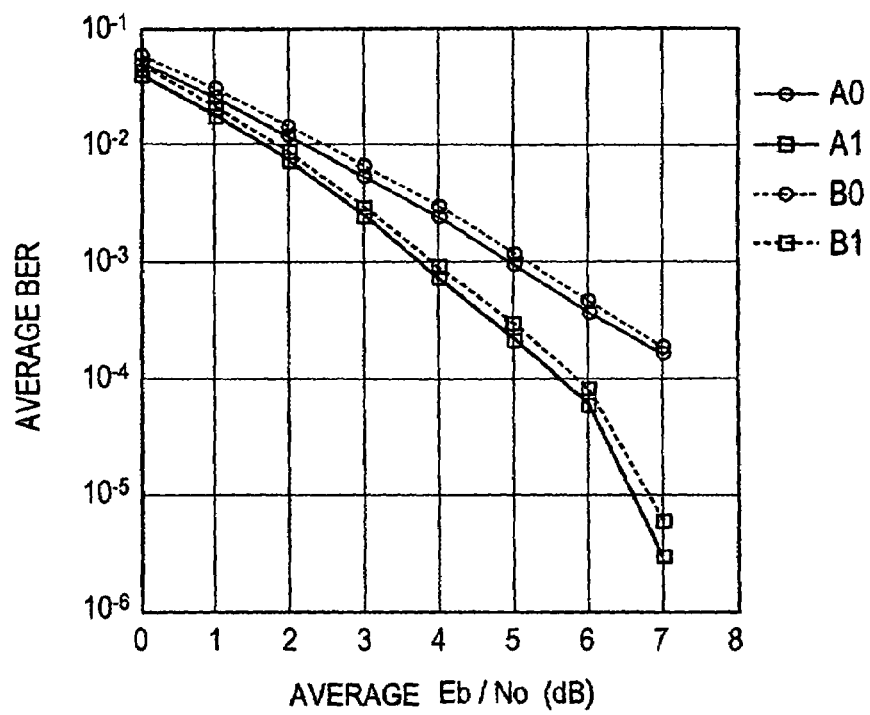
FIG. 5 is a graph for explaining the effect of the present invention.

As described above, this embodiment permits reduction of the computational complexity for deriving the tap coefficient of the linear equalizer that is used for iterative equalization. FIG. 5 shows an error rate characteristic obtained by computer simulations, for example, when an RLS (Recursive Least Squares) algorithm of excellent convergence characteristic is used as an adaptive algorithm for deriving the tap coefficient of a linear equalizer used for iterative equalization.

In FIG. 5, the ordinate represents BER (Bit Error Rate) and the abscissa Eb/No (bit energy-noise ratio). The modulation system used was BPSK (two-phase shift), the information transmission rate was 12 Mbps, and the maximum Doppler frequency indicating the fading variation rate was 1000 Hz. The frame configuration used is a unique word of a known pattern for first 128 symbols, then the channel impulse response $H_m(n)$ was estimated, and 128 symbols were added as information symbols to the end of the training symbols. The RLS algorithm was used for the estimation of the impulse response. The channel was set as a five-wave Rayleigh fading channel of the same level, and the receiving side was to perform two-branch diversity and iterative equalization by a five-tap linear filter. Further, SOVA (Soft-Output Viterbi Algorithm) was used for the decoding in the iterative equalization, and the number of iterations was two.

In FIG. 5, the curves A0 and A1 show tap coefficients of the linear filter obtained by conducting the inverse matrix calculation at respective point in time in the cases where the number of iterations were one and two, respectively. The curves B0 and B1 show the tap coefficients G(n) derived by the scheme according to the first embodiment of the present invention, the curve B0 indicating the tap coefficient values by using the adaptive algorithm and the curve B1 the tap coefficient values by using the Matrix Inversion Lemma when the number of iterations was two. In the case of the present invention, degradation of the bit error ratio is only on the order of 0.1 dB as compared with the ratio in the case of conducting the inverse matrix calculation at each point, it can be regarded as about the same as in the latter case. The present invention does not need to conduct the inverse matrix calculation expressed by Eq. (26), and hence it permits substantial reduction of the computational complexity for deriving the tap coefficient of the linear equalizer that is used for iterative equalization. Incidentally, it was confirmed that the same goes for the cases where the known pattern is 128-symbol and the number of information symbols is 256 and where the known pattern is 128-symbol and the number of information symbols is 512. This means that when the duration of a burst path (the frame length) is short about the same as these information symbol durations, impulse response variations of the channel can be ignored, and the bit error rate is approximately equal to that in the case of conducting the inverse matrix calculation at each symbol time, and with less computational besides. Letting M and J represent the number of antennas (channels) and the length of intersymbol interference (the number of taps of the linear filter 111), respectively, the computational complexity is around $O((MJ)^3)$ in the case of conducting the inverse matrix calculation at each symbol time, but in the above-described embodiment of the present invention the computational complexity is approximately $O((MJ)^3)$, which is substantially lower than in the above case.

While the examples of FIGS. 3 and 4 are shown to include two transversal filters 103 and 111 with a view to facilitating a better understanding of the function configuration, the number of filters need not always be two but may also be one. Moreover, the tap coefficient calculating part 112 and the adaptive estimation part 106 are shown as different blocks, but they can be combined into one unit.

As described previously, the one mode of the first embodiment utilizes the fact that the impulse response of the channel does not so vary over a short range of time, and hence it is characterized in that the training signal at the beginning of the received burst path (frame) or the known signal is used to obtain the estimated impulse response value $H_m(n)$, which is used to the subsequent processing.

Further, according to the other mode of this embodiment, in the second iterations of iteration, only a J-th element of a diagonal matrix is set to 1 which is a covariance matrix of the difference between the code bit vector B(n) and the estimated intersymbol interference code vector B'(n) as expressed by Eq. (31), and the other diagonal elements are approximated to zeros, by which the calculation for the tap coefficient G(n) becomes a vector calculation as indicated by Eq. (32)—this avoids the necessity of conducting the inverse matrix calculation and hence allows reduction of computational complexity. In the first processing the known signal (training signal) need not always be used, but instead the output from a discriminating part 150, which discriminates the output from the transversal filter 103 between two value in binary, may be used in place of the signal from the output of the switch 101 as indicated by the broken lines in FIG. 3. The estimated impulse response value $H_m(n)$ ultimately obtained by the first processing is used in the second and subsequent processing.

Embodiment 2

Figure 6:
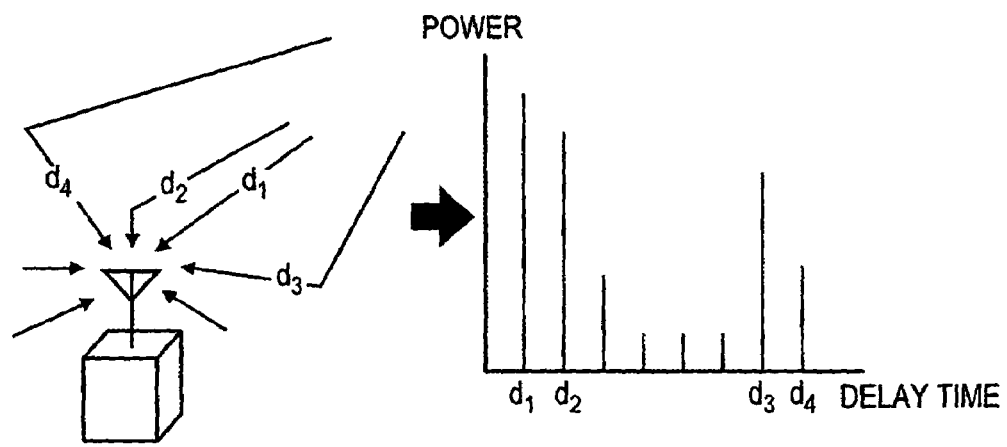
FIG. 6 is a diagram depicting an example of a multipath channel environment.

In the first embodiment described above with reference to FIGS. 3 and 4, all those of path components so-called multipath received signal R(n) arriving at the input terminal 104 via different paths which are within the range of the maximum number J of delayed symbols to be considered are equalized as will be seen from Eqs. (5), (6), (8) to (11), (15) and (25). According to the channel environment of the channel, however, path components of relatively large received power may sometimes arrive apart in time from other path components as indicated by multipath components d1, d2, . . . in FIG. 6. In such a channel environment, too, the first embodiment performs equalization of all the received path components concerned.

That is, in the first embodiment, path components within the range of the maximum number J of delayed symbols, even if very small, in extreme cases, zero in received power, are also subjected to equalization, and consequently, much time is needed for calculation. As a solution to this problem, this embodiment is adapted to omit particular ones of the dimensions corresponding to multipath components of negligibly small received power to reduce the sizes of vectors and matrixes to be handled, thereby reducing the computational complexity and hence shortening the calculating time.

Calculating the likelihood b'(n) of the soft decision value $\lambda_2[b(n)]$ for the code bit string b(n) that is the decoder output for the result $\Lambda_1[b(n)]$ of the first iteration of equalization, by Eq. (12) as in the second iterations of equalization in the first embodiment, the calculated value is virtually +1 or −1. Through utilization of this fact for the approximation of the estimated intersymbol interference code vector B'(n) as expressed by Eq. (30), the tap coefficient G(n) of the linear filter 111 can be calculated using the Matrix Inversion Lemma as follows:

$$G(n) = [H_L(n)H_L(n)^H + \sigma^2 I]^{-1} H_L(n) \quad (35)$$
$$= H_L(n)/(\sigma^2 + H_L(n)^H H_L(n))$$

where $H_L(n)$ is a column vector of a M by J length as shown below.

$$H_L(n) = [h_0(n; J-1) \ldots h_{M-1}(n; J-1)h_0(n; J-2) \ldots h_{M-1}(n; J-2) \ldots$$
$$\ldots h_0(n; 0) \ldots h_{M-1}(n; 0)]^T \quad (36)$$

By the approximation of $\Lambda(n)$ in Eq. (23) as indicated by Eq. (32), the equivalent amplitude $\mu(n)$ of the output signal is also calculated as expressed by (34).

On the other hand, Z(n) is given by $$Z(n) = G(n)^H R_c(n) \quad (37)$$

as is the case with Eq. (15). By using in Eq. (25) the linear filter output Z(n) obtained by Eq. (37), the extrinsic information value $\Lambda_1[b(n)]$ derived by the linear equalizer can be used as the results of second and subsequent equalizations.

Now, assume that path components j=1 to j=J−2 within the range of the maximum number J of delayed symbols to be considered in the equalizer have not arrived but that path components j=0 and j=J−1 have arrived. If the impulse response of the channel can accurately be estimated, other path components than effective ones are such that h(n;1),h(n;2), . . . , h(n;J−2)≡0. Accordingly, it follows from Eq. (35) that $$H_L(n) = [h_0(n; J-1) \ldots h_{M-1}(n; J-1)0 \ldots 0 \ldots 0 \ldots 0 \; h_0(n; 0) \quad (38)$$
$$\ldots h_{M-1}(n; 0)]^T$$

Since the tap coefficient G(n) of the linear filter can be calculated from $H_L(n)$ as shown by Eq. (35), it follows that $$G(n) = [g_0(n;J-1) \ldots g_{M-1}(n;J-1)0 \ldots 0 \; g_0(n;0) \ldots$$
$$g_{M-1}(n;0)]^T \quad (39)$$

The derivation of the soft decision value $\Lambda_1[b(n)]$ by the linear equalizer by Eq. (25) requires the calculation of the equivalent amplitude $\mu(n)$ of the output signal by Eq. (36) and the linear filter output Z(n) by Eq. (37). The equivalent amplitude $\mu(n)$ and the linear filter output Z(n) are calculated as shown below.

$$\mu(n) = H_L(n)^H G(n) \quad (40)$$
$$h_0(n; J-1) \times g_0(n; J-1) + \ldots + h_{M-1}(n; J-1) \times$$
$$g_{M-1}(n; J-1) + \ldots + 0 \times 0 + \ldots + 0 \times 0 + \ldots +$$
$$h_0(n; 0) \times g_0(n; 0) + \ldots + h_{M-1}(n; 0) \times g_{M-1}(n; 0)$$

Here, in the case where zero-elements of $H_L(n)^H$ and G(n) are omitted, that is, where the dimensions of $H_L(n)^H$ and G(n) are lowered as shown below, too, the value of $\mu(n)$ naturally remains unchanged.

$$H_L'(n)^H = [h_0(n;J-1) \ldots h_{M-1}(n;J-1)h_0(n;0) \ldots$$
$$h_{M-1}(n;0)] \quad (41)$$

$$G'(n) = [g_0(n;J-1) \ldots g_{M-1}(n;J-1)g_0(n;0) \ldots g_{M-1}$$
$$(n;0)]^T \quad (42)$$

$$\mu(n) = H_L'(n)^H G'(n) \quad (43)$$
$$= h_0(n; J-1) \times g_0(n; J-1) + \ldots + h_{M-1}(n; J-1) \times$$
$$g_{M-1}(n; J-1) + h_0(n; 0) \times g_0(n; 0) + \ldots +$$
$$h_{M-1}(n; 0) \times g_{M-1}(n; 0)$$

And, Z(n) becomes as follows:

$$Z(n) = G(n)^H R_c(n) = \quad (44)$$
$$g_0(n; J-1) \times r_0(n+J-1) + \ldots + g_{M-1}(n; J-1) \times$$
$$r_{M-1}(n+J-1) + \ldots + 0 \times r_0(n+J-2) + \ldots + 0 \times$$
$$r_{M-1}(n+J-2) + \ldots + 0 \times r_0(n+1) + \ldots + 0 \times$$
$$r_{M-1}(n+1) + g_0(n; 0) \times r_0(n) + \ldots + g_{M-1}(n; 0) \times$$
$$r_{M-1}(n)$$

In Eq. (44), since $G(n)^H$ has 0-elements, the values of $R_c(n)$ corresponding to the 0-elements are unnecessary in the derivation of Z(n) as shown below.

$$R_c'(n) = [r_0(n+J-1) \ldots r_{M-1}(n+J-1) r_0(n) \ldots r_{M-1}(n)] \quad (45)$$

$$Z'(n) = G'(n)^H R_c'(n) = \quad (46)$$
$$g_0(n; J-1) \times r_0(n+J-1) + \ldots + g_{M-1}(n; J-1) \times$$
$$r_{M-1}(n+J-1) + \ldots + g_0(n; 0) \times r_0(n) + \ldots +$$
$$g_{M-1}(n; 0) \times r_{M-1}(n)$$

Since the dimension of $R_c(n)$ can be lowered as described above, the dimension of the received signal vector R(n) can also be lowered by Eq. (14). Further, since the dimension of the intersymbol interference component replica $H_m(n)B'(n)$ can also be reduced, the dimension of the channel matrix $H_m(n)$ can be reduced as well.

From the above, it can be seen that calculations for the path components having arrived can be dispensed with in the calculation for deriving the extrinsic information by the linear equalizer. That is, in the estimated impulse response value of the channel, the tap coefficient G(n) of the linear filter, the received signal vector R(n) and $R_c(n)$ obtained by subtracting the intersymbol interference component from the received signal vector, those elements of vectors and matrixes corresponding to path components having not arrived can be removed. Accordingly, it is possible to decrease the number of dimensions of vector components and the number of elements of matrixes necessary for the calculation involved in the derivation of the soft decision value of the linear equalizer.

However, the estimated impulse response value does not become zero due to an error in the estimation of the impulse response of the channel. Hence, a certain threshold value $h_{th}$ is set for comparison and discrimination of the estimated impulse response value as described below. For example, if $h(n;1),h(n;2),\ldots h(n;J-2) \leq h_{th}$, then it is regarded as $h(n;1),h(n;2),\ldots h(n;J-2) \equiv h_{th}$. Letting L represent the number of effective received path components larger than the threshold value $h_{th}$, the dimension of the estimated impulse response vector $H_L(n)$, which indicates all estimated impulse response values within the range of the maximum number J of delayed symbols, can be lowered from an M*J-th dimensional vector to an M*L-th dimensional vector $H'_L(n)$ as expressed below.

$$H_L(n) = [h_0(n;J-1) \ldots h_{M-1}(n;J-1) 0 \ldots 0 \, h_0(n;0) \ldots h_{M-1}(n;0)]^T \quad (47)$$

$$H_L'(n) = [h_0(n;J-1) \ldots h_{M-1}(n;J-1) h_0(n;0) \ldots h_{M-1}(n;01)]^T \quad (48)$$

Further, the number of row elements of the channel matrix $H_m(n)$ can be lowered from 2J−1 to 2L−1.

$$H_m(n) = \begin{bmatrix} h(n;0) & h(n;1) & \cdots & h(n;J-1) & 0 & \cdots & 0 \\ 0 & h(n;0) & h(n;1) & \cdots & h(n;J-1) & 0 & 0 \\ \vdots & & & \ddots & & & \vdots \\ 0 & 0 & h(n;0) & h(n;1) & \cdots & h(n;J-1) & 0 \\ 0 & \cdots & 0 & h(n;0) & h(n;1) & \cdots & h(n;J-1) \end{bmatrix}_{MJ \times (2J-1)} \quad (49)$$

$$H_m'(n) = \begin{bmatrix} h(n;0) & 0 & \cdots & h(n;J-1) & 0 & \cdots & 0 \\ 0 & \cdots & 0 & h(n;0) & 0 & \cdots & h(n;J-1) \end{bmatrix}_{ML \times (2J-1)} \quad (50)$$

If $$h(n;1),h(n;2),\ldots h(n;J-2) \leq h_{th},$$

then $$g_0(n;1) \ldots g_{M-1}(n;1), g_0(n;2) \ldots g_{M-1}(n;^2), \ldots, g_0(n;J-2) \ldots g_{M-1}(n;J-2) \equiv 0$$

is set; the tap coefficient vector G(n) of the linear filter in the second iterations of iteration is given by the following equation.

$$G'(n) = [g_0(n;J-1) \ldots g_{M-1}(n;J-1) g_0(n;0) \ldots g_{M-1}(n;0)]^T \quad (51)$$

This is apparent from Eq. (35) in the calculation of $H_L'(n)^H H_L'(n)$. Moreover, the tap coefficient vector G(n) can also be lowered from the M*J-th dimensional vector to the M*L-th dimensional vector G'(n).

Similarly, the received signal vector R(n) and the difference vector $R_c(n)$ can also be lowered from the M*J-th to the M*L-th dimension.

The equivalent amplitude μ(n) of the output signal can be calculated by Eq. (43) from $H_L'(n)$ and G'(n), and the linear filter output Z'(n) can be calculated by Eq. (46) from $G'(n)^H$ and $R_c'(n)$. Accordingly, they can each be derived by calculations of vectors of low dimensionality.

Furthermore, it is possible to lower the dimension of the number of column elements at positions of path components regarded as zeros in the channel matrix Hm'(n) of Eq. (50) generated from the estimated impulse response value as expressed by the following equation, and the dimension of the channel matrix for deriving the soft decision value by Eq. (25) can also be reduced. In an example in which only paths of j=0 and j=J are set as effective paths, the number of column elements can be decreased from (2J−1) to (2L−1).

$$H'_m(n) = \begin{bmatrix} h(n; 0) & h(n; J-1) & 0 \\ 0 & h(n, 0) & h(n; J-1) \end{bmatrix}_{ML \times (2L-1)} \quad (52)$$

Figure 7:
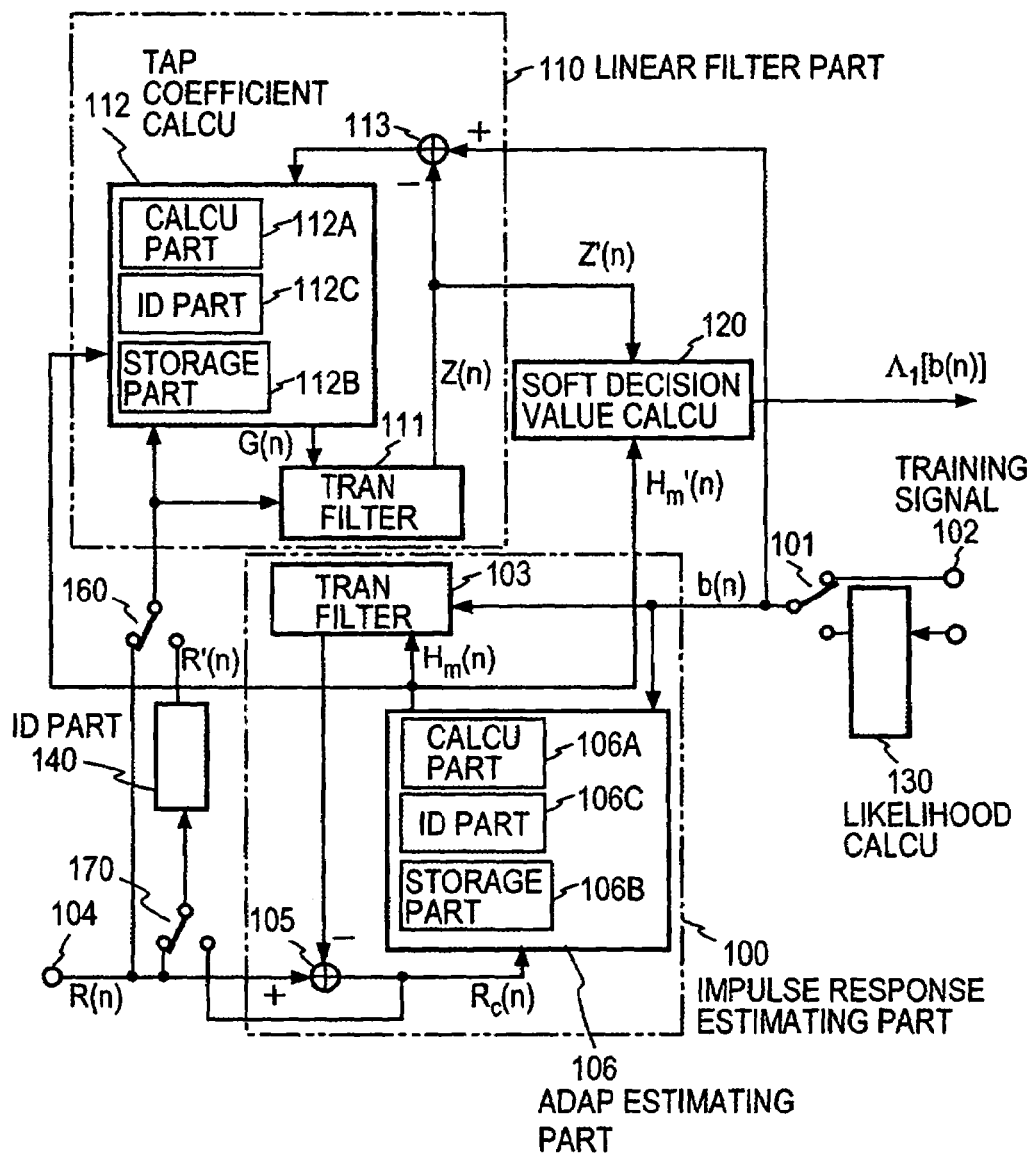
FIG. 7 is a block diagram illustrating the functional configuration for first equalization processing in a second embodiment of the adaptive equalizer according to the present invention.
Figure 8:
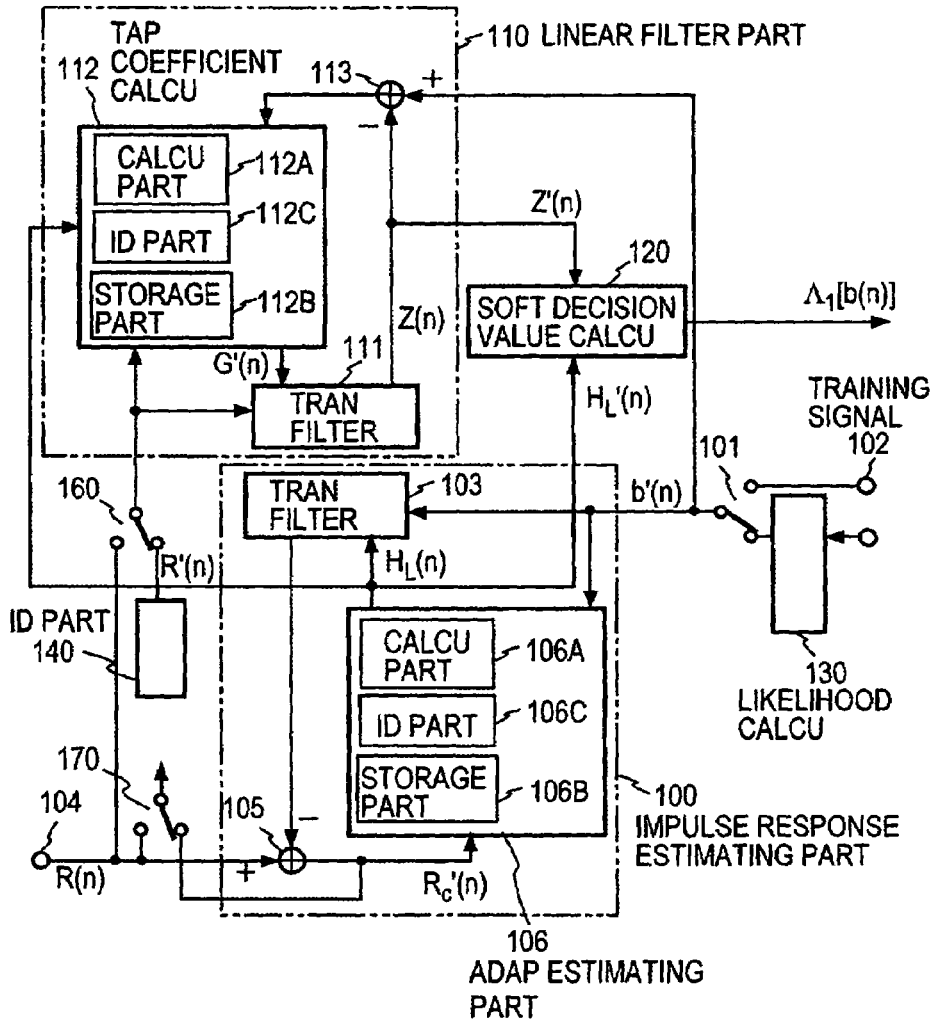
FIG. 8 is a block diagram of the functional configuration in second and subsequent rounds of equalization.

FIGS. 7 and 8 illustrate in block form examples of functional configurations in the first iteration and second and subsequent rounds of equalization. In this embodiment, an identifying part 140 and a switch 170 are additionally provided in the functional configuration of the first embodiment shown in FIGS. 3 and 4, and the tap coefficient calculating part 112 is composed of a calculating part 112A, a storage part 112B and an identifying part 112C. The adaptive estimation part 106 is also added with an identifying part 106C.

Figure 9:
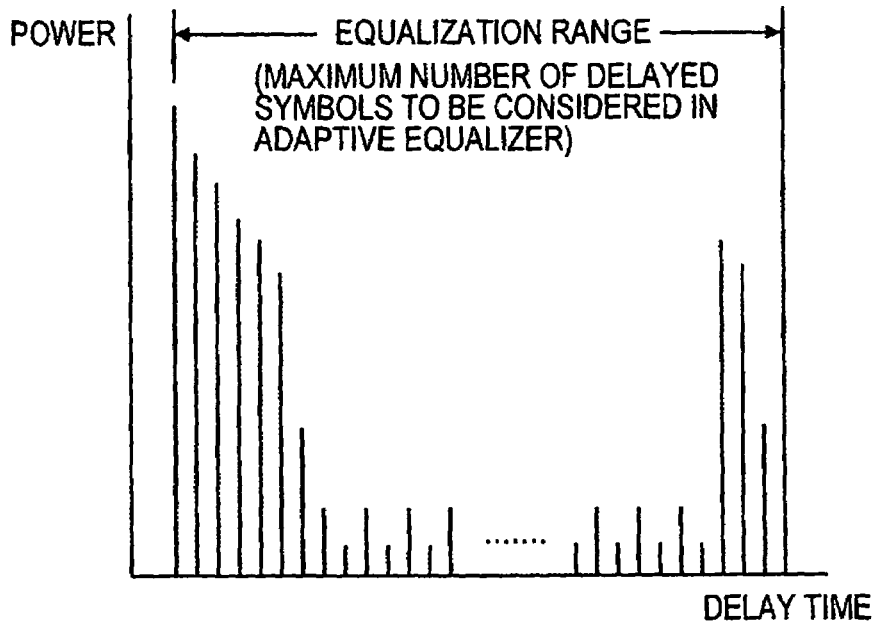
FIG. 9 is a graph showing an example of an impulse response contained in the received signal.
Figure 10:
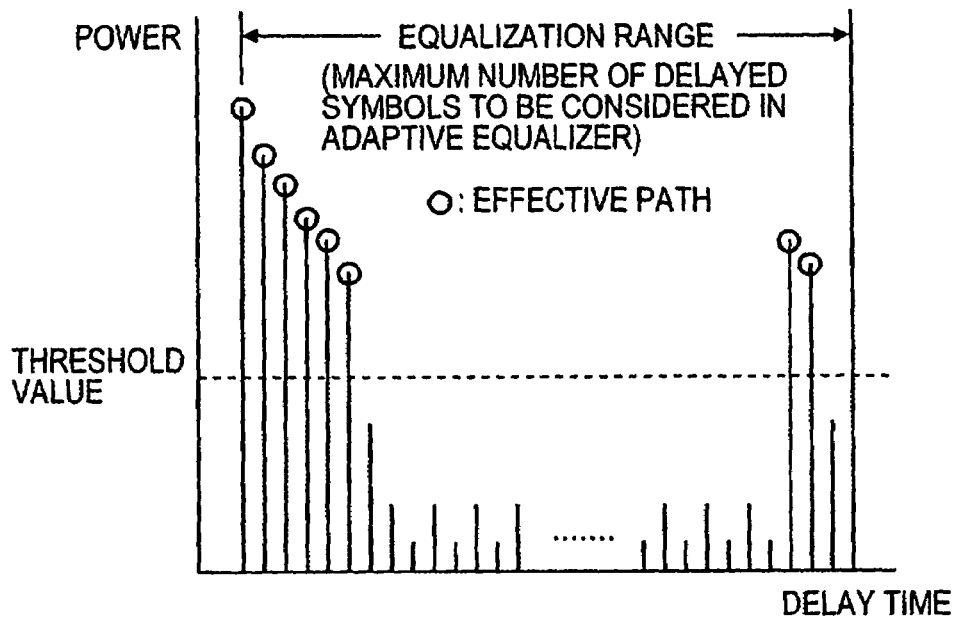
FIG. 10 is a graph showing an example of selecting effective paths from the impulse response.

In the first place, the switch 101 is connected to the terminal 102, and the switches 160 and 170 are both connected to the terminal 104. In the first iteration of equalization the processes for obtaining the estimated impulse response value $H_m(n)$ and the tap coefficient G(n) are the same as in the first embodiment. Further, in FIG. 7, effective paths are identified by the identifying part 106C based on the estimated impulse response value $H_m(n)$ having converged at the end of the training signal. Assume, for example, that estimated impulse response values are obtained at respective symbol delay times within the range of the maximum number J of delayed symbols as shown in FIG. 9. The effective path identifying method is, for instance, to select paths above a certain threshold value $h_{th}$ as depicted in FIG. 10. The threshold value $h_{th}$ is for instance, the average power of all received paths, and received paths above the average power are selected. The effective paths thus identified are each represented, for example, by the number of delayed symbols and stored in the storage part 106B together with the corresponding tap coefficient value h. This data may be stored as data of the vector $H_L'(N)$ given by Eq. (48) or as data of the matrix $H_m'(n)$ given by Eq. (48); and it can easily be obtained from the one to the other and vice versa. Further, only those of the tap coefficient vectors G(n) of the linear filter 111 which correspond to the effective paths identified by the identifying part 106C are each stored as the tap coefficient vector G'(n) in the storage part 112B.

Moreover, the switch 160 is switched to the identifying part 140, in which only an information symbol received signal R'(n) corresponding to the effective path in the signals received after the training signal, that is, in the information symbol received signals R(n), is selected, and the thus selected signal is subjected to linear filtering by the transversal filter 111 using its tap coefficient G'(n) stored in the storage part 112B most recently. The linear filtering output Z'(n) and the most recently estimated impulse response value $H'_L(n)$ are used to calculate the soft decision value $\Lambda_1[b(n)]$ in the soft decision value calculating part 120.

In the second and subsequent rounds of equalization, the switch 101 is connected to the likelihood calculating part 130, the switch 160 to the identifying part 140 and the switch 170 to the output of the subtractor 105 as depicted in FIG. 8. The likelihood b'(n) representing the estimated intersymbol interference code, provided from the likelihood calculating part 130, is subjected to filtering by the transversal filter 103 using the estimated impulse response value $H_L(n)$ stored in the storage part 106B, and the output replica $H_L(n)b'(n)$ is subtracted by the subtractor 105 from the received signal sample value sequence R'(n) to obtain the difference value $R_c'(n)$. For only the path identified in the identifying part 106C of the impulse response estimating part 100, the difference value $R_c'(n)$ is identified by the identifying part 140, and the identification result is input to the linear filter 111. The tap coefficient G'(n) of the linear filter 111 is derived from only the estimated impulse response value $H_L'(n)$ stored in the storage part 106B, by Eq. (35) through utilization of the Matrix Inversion Lemma, and the tap coefficient G'(n) is stored in the storage part 112B. The thus stored estimated impulse response value $H_L'(n)$, the tap coefficient G'(n) of the linear filter 111 and the identified difference value $R_c'(n)$ are used to calculate the soft decision value $\Lambda_1[b(n)]$ in the soft decision value calculating part 120.

Figure 11:
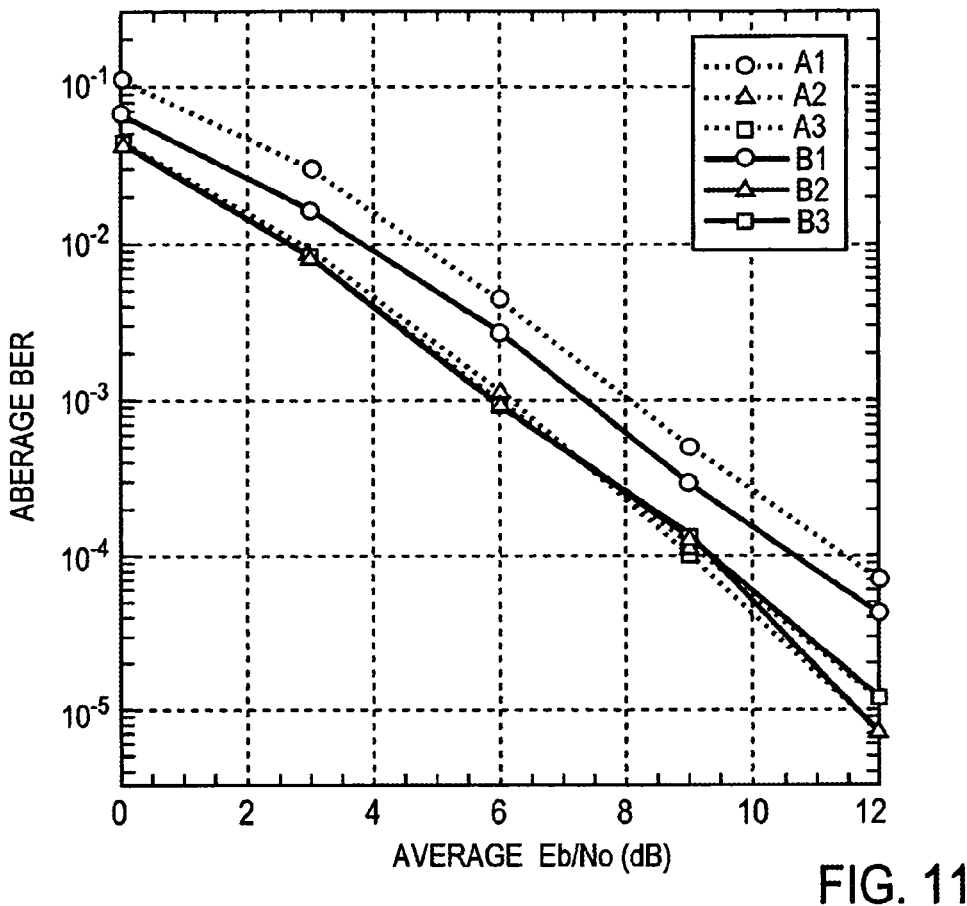
FIG. 11 is a graph for explaining the effect of the present invention.

As described above, the second embodiment permits reduction of the computational complexity for deriving the soft decision value of the linear equalizer. FIG. 11 shows the results of computer simulations of the bit error rate characteristic in the case of using the RLS (Recursive Least Squares) algorithm of excellent convergence characteristic for deriving the tap coefficient of the linear equalizer in the first iteration of iterative equalization and the Matrix Inversion Lemma in the second and subsequent iterations of iterative equalization.

Figure 12:
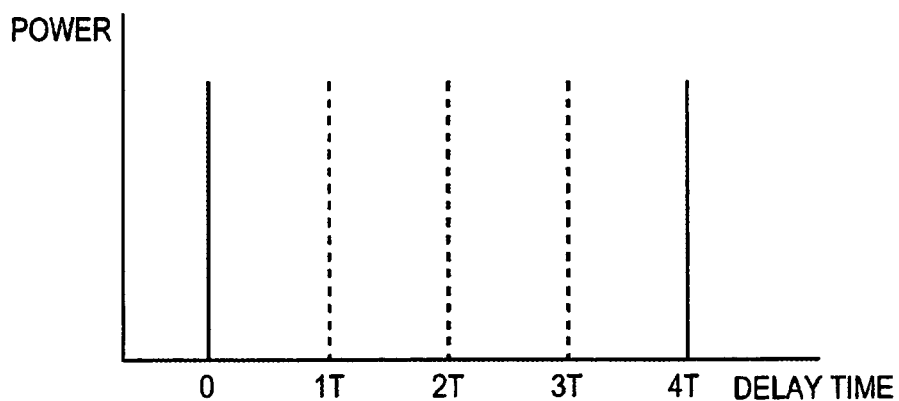
FIG. 12 is a graph for explaining a channel model used for computer simulations.

The modulation system used is BPSK; the information transmission rate is 10 Mbps; the maximum Doppler frequency indicating the fading variation is 1000 Hz; and the frame configuration is one that a training signal of a known pattern of 63 symbols is added as an information signal to 256 symbols. A channel, in which only path components j=0 and j=4 as indicated by the solid lines in FIG. 12 had arrived, was assumed as a channel model. The receiving side performs two-branch diversity and uses SOVA (Soft-Output Viterbi Algorithm) for decoding. On the assumption that the channel was ideally estimated, the number of iterations was set to three.

In FIG. 11, the curves A1, A2 and A3 show the results obtained in the cases where: equalization was performed once and iterated twice and three times, respectively; the tap number of the linear equalizer was considered for 0 to 4T delayed paths; and the entire information of five taps was used as the tap coefficient of the linear equalizer. The curves B1, B2 and B3 show the results obtained in the cases where: equalization was similarly performed once and iterated twice and three times, respectively; and two-tap (only 0 and 4T delayed paths) information was used as the tap number of the linear equalizer.

As is evident from FIG. 11, a comparison of the results obtained with the use of five-tap and two-tap information as the tap number of the linear equalizer indicates that two and three iterations of equalization provide about the same error rate characteristic with low computational complexity.

EFFECT OF THE INVENTION

As described above, the first embodiment of the present invention enables the linear equalizer for iterative equalization enables to reduce the computational complexity for calculating the tap coefficient of the linear filter and hence shorten the time for the calculation.

According to the second embodiment of the invention, in a channel environment in which path components of relatively large power have arrived apart in time from other path components, it is possible to adaptively reduce the computational complexity for calculating the extrinsic information by the linear equalizer that performs iterative equalization.

What is claimed is:

1. An adaptive equalization method in decoding process for decoding a received signal for a code bit b(n) by iterating adaptive equalization of said received signal for a code bit b(n) a plurality of times, an adaptive equalization in which a second soft decision value $\lambda_2[b(n)]$ generated by the soft decision of said code bit b(n) is provided as a priori information, and the equalization of a received signal R(n) of an M-channel through utilization of said a priori information and outputting of a first soft decision value $\lambda_1[b(n)]$ are iterated to adaptively equalize said received signal R(n), said method comprising the steps of:

in a first round of equalization, (a) calculating an estimated impulse response value $H_m(n)$ of said M-channel and tap coefficients G(n) for linear filtering by the first round of adaptive equalization of said received signal R(n) of said M-channel, and outputting said first soft decision value $\lambda_1[b(n)]$;

in the second and subsequent rounds of equalization, (b) calculating the likelihood b'(n) of a code bit sequence b(n) from said second soft decision value $\lambda_2[b(n)]$ obtained by decoding said code bit b(n) based on said first soft decision value $\lambda_1[b(n)]$;

(c) calculating an estimated impulse response value vector $H_L(n)$ by approximation with the intersymbol interference component for the code bit b(n) regarded as zero, and calculating the tap coefficients G(n) for said linear filtering from said estimated impulse response value vector $H_L(n)$ to update said tap coefficients G(n);

(d) linear-filtering said likelihood b'(n) of said code bit sequence b(n) with said estimated impulse response value $H_L(n)$ to generate a replica of the received signal R(n);

(e) subtracting said replica from said received signal R(n) to generate a difference signal $R_c(n)$ without intersymbol interference;

(f) linear-filtering said difference signal Rc(n) with said tap coefficients G(n) to generate a signal Z(n); and (g) outputting, as the results of said second and subsequent rounds of adaptive equalization, the first soft decision value $\lambda_1[b(n)]$ updated with said signal Z(n) and said estimated impulse response value vector $H_L(n)$.

2. The method of claim 1, wherein said step (a) comprises the steps of:

(a-1) calculating the estimated impulse response value $H_m(n)$ of said M-channel based on said received signal R(n) and a known signal;

(a-2) calculating said tap coefficients G(n) by an adaptive algorithm based on said received signal R(n) and said known signal;

(a-3) linear-filtering said received signal R(n) with said tap coefficients G(n); and (a-4) calculating said first soft decision value $\lambda_1[b(n)]$ from said signal Z(n) and said estimated impulse response value $H_m(n)$.

3. The method of claim 1 or 2, wherein said step (c) includes a step of calculating the tap coefficients G(n) for said linear filtering from said estimated impulse response value vector $H_L(n)$ through utilization of a Matrix Inversion Lemma.

4. The method of claim 1, wherein said step (a) comprises the steps of:

(a-1) calculating the estimated impulse response value $H_m(n)$ of said M-channel channel based on a sample value sequence of said received signal R(n) and a known signal;

(a-2) determining from said estimated impulse response value $H_m(n)$ whether the received signal power is larger than a predetermined reference value, and, if larger than said reference value, storing the corresponding path as an effective path in a memory;

(a-3) calculating said tap coefficients G(n) based on said received signal R(n) and said known signal, storing tap coefficients G'(n) for said linear filtering corresponding to said effective path in a memory, and storing a received signal vector R'(n) corresponding to said effective path in a memory; and (a-4) calculating said first soft decision value $\lambda_1[b(n)]$ from said estimated impulse response value $H_m(n)$, said tap coefficients G'(n) and said received signal vector R'(n).

5. The method of claim 4, wherein:

said step (c) comprises the steps of:

(c-1) calculating the tap coefficients G'(n) for said linear filtering corresponding to said effective path from said estimated impulse response value $H_L'(n)$ composed of the components corresponding to said effective path through utilization of an Matrix Inversion Lemma; and (c-2) storing said tap coefficients G'(n) for said linear filtering corresponding to said effective path in a memory;

said step (d) is a step of linear-filtering said tap coefficients G'(n) with said estimated impulse response value vector $H_L'(n)$ to obtain a replica signal;

said step (e) is a step of storing in a memory a difference signal R'(n) corresponding to said effective path, said difference signal $R_c'(n)$ being obtained by subtracting said replica signal from said received signal R'(n);

said step (f) is a step of linear-filtering said difference signal $R_c'(n)$ with said tap coefficients G'(n) to generate a signal Z'(n); and said step (g) is a step of calculating said first soft decision value $\lambda_1[b(n)]$ from said estimated impulse response value vector $H_L'(n)$ and said signal Z'(n).

6. The method of claim 1, wherein, letting J represent the maximum number of delayed symbols to be considered, and letting a received signal sample vector of an M-channel be represented by $r(n)=[r_0(n)r_1(n) \ldots r_{M-1}(n)]^T$, said received signal vector R(n) by $R(n)=[r(n+J-1)r(n+J-2) \ldots r(n)]^T$, a channel weighting coefficient vector by $h(n;j)=[h_0(n;j)h_1(n;j) \ldots h_{M-1}(n;j)]^T$, and a channel matrix $H_m(n)$ of said estimated impulse response value by $$H_m(n) = \begin{bmatrix} h(n;0) & h(n;1) & \cdots & h(n;J-1) & 0 & \cdots & 0 \\ 0 & h(n;0) & h(n;1) & \cdots & h(n;J-1) & 0 & 0 \\ \vdots & & & \ddots & & & \vdots \\ 0 & 0 & h(n;0) & h(n;1) & \cdots & h(n;J-1) & 0 \\ 0 & \cdots & 0 & h(n;0) & h(n;1) & \cdots & h(n;J-1) \end{bmatrix}_{MJ \times (2J-1)}$$

said step (a) comprises the steps of:
- (a-1) linear-filtering a training signal b(n) in a training signal period with said estimated impulse response value $H_m(n)$ to generate a replica $H_m(n)b(n)$;
- (a-2) generating the difference between said received signal R(n) and said replica $H_m(n)b(n)$ as a difference vector $R_c(n)$;
- (a-3) linear-filtering said received signal R(n) with said tap coefficients G(n) to generate an output $Z(n)=G(n)^H R(n)$;
- (a-4) determining said tap coefficients G(n) by an adaptive algorithm based on the difference between said output Z(n) and said training signal b(n); and
- (a-5) calculating a soft decision value $\lambda_1[b(n)]=4\text{Real}\{Z(n)\}/(1-\mu)$ based on the estimated impulse response value $H_m(n)$ for linear filtering and said output Z(n), $$\lambda_1[b(n)] = \frac{4Real\{Z(n)\}}{1 - \mu(n)}$$

$$\mu(n) = (H_L(n))^H G(n)$$

as the output of said second and subsequent rounds of equalization from said output Z(n) and said estimated impulse response value vector $H_L(n)$.

7. The method of claim 5, wherein, letting J represent the maximum number of delayed symbols to be considered, and letting a received signal sample vector of an M-channel be represented by $r(n)=[r_0(n)r_1(n) \ldots r_{M-1}(n)]^T$, said received signal vector R(n) by $R(n)=[r(n+J-1)r(n+J-2) \ldots r(n)]^T$, a channel weighting coefficient vector by $h(n;j)=[h_0(n;j)h_1(n;j) \ldots h_{M-1}(n;j)]^T$, and a channel matrix $H_m(n)$ of said estimated impulse response value by $$H_m(n) = \begin{bmatrix} h(n;0) & h(n;1) & \cdots & h(n;J-1) & 0 & \cdots & 0 \\ 0 & h(n;0) & h(n;1) & \cdots & h(n;J-1) & 0 & 0 \\ \vdots & & & \ddots & & & \vdots \\ 0 & 0 & h(n;0) & h(n;1) & \cdots & h(n;J-1) & 0 \\ 0 & \cdots & 0 & h(n;0) & h(n;1) & \cdots & h(n;J-1) \end{bmatrix}_{MJ \times (2J-1)}$$

and outputting said soft decision value $\lambda_1[b(n)]=4\text{Real}\{Z(n)\}/(1-\mu)$ as the result of said first round of equalization;

said step (b) is a step of calculating the likelihood $b'(k)=\tanh[\lambda_2[b(k)/2]$ of a code bit sequence b(k) from a soft decision value $\lambda_2[b(n)]$ of a decoded bit provided as a priori information with said k set within the range of $n-(j-1) \leq k \leq n+(J-1)$;

said step (c) is a step of calculating said tap coefficients G(n) by approximating $$G(n)=[H_L(n)H_L(n)^H - \sigma^2 I]^{-1}H_L(n)$$

$$H_L(n)=[h_0(n;J-1) \ldots h_{M-1}(n;J-1)h_0(n;J-2) \ldots h_{M-1}(n;J-2) \ldots h_0(n;0) \ldots h_{M-1}(n;0)]^T$$

said step (d) is a step of linear-filtering, with said $H_L(n)$, an estimated value vector, $$B'(n)=[b'(n+(J-1))b'(n+(J-2)) \ldots b'(n+1)0b'(n-1) \ldots b'(n-(J-1))]^T,$$

of a code bit that affects, as intersymbol interference, said code bit b(n) at time n to thereby obtain a replica $H_L(n)B'(n)$;

said step (e) is a step of calculating a difference vector $R_c(n)=R(n)-H_L(n)B'(n)$ between said replica $H_L(n)B'(n)$ and said received signal R(n);

said step (f) is a step of linear-filtering said difference vector $R_c(n)$ with said tap coefficients G(n) and outputting the result of said linear filtering $Z(n)=G(n)^H R_c(n)$; and said step (g) is a step of obtaining a soft decision value said step (a-3) comprises the steps of:
- (a-3-1) linear filtering a training signal b(n) in a training signal period with said estimated impulse response value $H_m(n)$ to generate a replica $H_m(n)b(n)$;
- (a-3-2) generating the difference between said received signal R(n) and said replica $H_m(n)b(n)$ as a difference vector $R_c(n)$;
- (a-3-3) linear filtering said received signal R(n) with said tap coefficients G(n) to generate an output $Z(n)=G(n)^H R(n)$; and
- (a-3-4) determining said tap coefficients G(n) by an adaptive algorithm based on the difference between said output Z(n) and said training signal b(n), and storing a received signal R'(n) and a tap coefficients G'(n) of those components of said received signal R(n) and said tap coefficients G(n) which correspond to said effective path;

said step (a-4) is a step of calculating a soft decision value $\lambda_1[b(n)]=4\text{Real}\{Z(n)\}/(1-\mu)$ based on the estimated impulse response value $H_m'(n)$ for said linear filtering and said output Z(n), and outputting said soft decision value $\lambda_1[b(n)]=4\text{Real}\{Z(n)\}/(1-\mu)$ as the result of said first round of equalization;

said step (b) is a step of calculating the likelihood $b'(k)=\tanh[\lambda_2[b(k)/2]$ of a code bit sequence b(k) from a soft decision value $\lambda_2[b(n)]$ of a decoded bit provided as a priori information with said k set within the range of $n-(j-1) \leq k \leq n+(J-1)$;

said step (c-1) is a step of calculating said tap coefficients G'(n) by approximating $$G'(n)=[H_L'(n)^H - \sigma^2 I]^{-1}H_L'(n)$$

$$H_L'(n)=[h_0(n;J-1) \ldots h_{M-1}(n;J-1)h_0(n;J-2) \ldots h_{M-1}(n;J-2) \ldots h_0(n;0) \ldots h_{M-1}(n;0)]^T$$

said step (d) is a step of linear filtering, with said HL'(n), an estimated value vector, $$B'(n)=[b'(n+(J-1))b'(n+(J-2))\ldots b'(n-1)0b'(n-1)\ldots b'(n-(J-1))]^T,$$

of a code bit that affects, as intersymbol interference, said code bit b(n) at time n to thereby obtain a replica $H_L(n)B'(n)$;

said step (e) is a step of calculating a difference vector $R_c'(n)=R'(n)-H_L'(n)B'(n)$ between said replica $H_L'(n)B'(n)$ and said received signal R'(n);

said step (f) is a step of linear-filtering said difference vector $R_c'(n)$ with said tap coefficients G'(n) and outputting the result of said linear filtering $Z'(n)=G'(n)^H R_c'(n)$; and said step (g) is a step of obtaining a soft decision value $$\Lambda_1[b(n)] = \frac{4\operatorname{Real}\{Z'(n)\}}{1-\mu(n)}$$

$$\mu(n) = (H_L'(n))^H G'(n)$$

as the output of said second and subsequent rounds of equalization from said output Z'(n) and said estimated impulse response value vector $H_L'(n)$.

8. An adaptive equalizer comprising:

an impulse response estimating part for calculating an estimated impulse response value $H_m(n)$ of each of Channel based on a received signal R(n) and a known signal;

a tap coefficients calculating part for calculating tap coefficients G(n) of a linear filter by an adaptive algorithm based on said received signal R(n) and said known signal;

said linear filter having set therein said tap coefficients G(n), for linear-filtering said received signal R(n);

a soft decision value calculating part for calculating a soft decision value $\Lambda_1[b(n)]$ from said estimated impulse response value $H_m(n)$ and the result of said linear filtering;

a storage part for storing said estimated impulse response value $H_m(n)$;

a likelihood calculating part for calculating, from said soft decision value $\Lambda_2[b(n)]$, its likelihood b'(n); and means for obtaining a replica of said received signal by subjecting said likelihood b'(n) to linear filtering with an estimated intersymbol interference vector B'(n) obtained from said stored estimated impulse response value vector $H_m(n)$ by approximating intersymbol interference components with respect to the code bit b(n) to zero;

wherein said tap coefficients calculating part includes means for calculating the tap coefficients G(n) of said linear filter by an adaptive algorithm based on said received signal R(n) and said known signal when said soft decision value is not input to said tap coefficients calculating part, and for calculating said tap coefficients G(n) from said estimated impulse response value vector $H_m(n)$ when said soft decision value is input to said tap coefficients calculating part; and said linear filter being adapted to perform linear filtering of said received signal R(n), in the absence of said soft decision value, and the difference between said received signal and said replica signal $H_m(n)B'(n)$, in the presence of said soft decision value through the use of said tap coefficients G(n), and provides the linear filtering output to said soft decision value calculating part.

9. The adaptive equalizer of claim 8, further comprising:

a path decision part for determining from said estimated impulse response value $H_m(n)$ of said each channel whether the received power of the corresponding path is larger than a predetermined reference value $h_{th}$;

a path memory for storing as an effective path a path determined as being larger than said predetermined reference value $h_{th}$;

a tap coefficients memory for storing as new tap coefficients G'(n) the components of that one of said tap coefficients corresponding to said effective path; and a signal identifying part for identifying that received signal components of said received signal R(n) corresponding to said effective path;

wherein said soft decision value calculating part calculates said soft decision value from the received signal components corresponding to said effective path, the estimated impulse response value corresponding to said effective path and the tap coefficients corresponding to said effective path.

10. The adaptive equalizer of claim 9, further comprising:

a likelihood calculating part for calculating the likelihood b'(n) of a code from said soft decision value;

a replica generating linear filter for generating a replica signal $H_L(n)b'(n)$ of said received signal by linear-filtering said likelihood b'(n) with an estimated impulse response value $H_L(n)$ composed of that components of said estimated response value vector corresponding to said effective path;

a subtractor for subtracting said replica signal $H_L(n)b'(n)$ from that components R'(n) of said received signal corresponding to said effective path to obtain a difference signal; and wherein said tap coefficients calculating part calculates, in second and subsequent rounds of equalization, the tap coefficients G'(n) of said linear filter from said estimated impulse response value vector $H_L'(n)$ corresponding to said effective path through the use of a Matrix Inversion Lemma; and said soft decision calculating part is a means for calculating, in said second and subsequent rounds of equalization, said soft decision value $\Lambda_1[b(n)]$ from said estimated impulse response value vector $H_L'(n)$ corresponding to said effective path, said tap coefficients G'(n) of said linear filter corresponding to said effective path and said difference signal $R_c'(n)$ corresponding to said effective path.

* * * * *

UNITED STATES PATENT AND TRADEMARK OFFICE
CERTIFICATE OF CORRECTION

PATENT NO.          : 7,027,497 B2
APPLICATION NO. : 10/017591
DATED                    : April 11, 2006
INVENTOR(S)         : Hiroo Ohmori et al.

It is certified that error appears in the above-identified patent and that said Letters Patent is hereby corrected as shown below:

Title page item (75) change from
"Hiroo Ohmori, Yokohama (JP); Takahiro Asai, Yokosuka (JP); Tadashi Matsumoto, Ebina (JP)"

to --Hiroo Ohmori, Yokohama (JP); Takahiro Asai, Yokosuka (JP); Shigeru Tomisato, Okayama (JP); Tadashi Matsumoto, Ebina (JP)--.

Signed and Sealed this

Third Day of November, 2009

David J. Kappos
*Director of the United States Patent and Trademark Office*